UNITED STATES PATENT OFFICE.

JOSEPH H. KÖNIG, OF MASON CITY, WEST VIRGINIA, ASSIGNOR TO HIMSELF, E. OAKES, AND HERMAN LERNER, OF SAME PLACE.

IMPROVEMENT IN PROCESSES OF RECOVERING SALT FROM ITS ADMIXTURE WITH IMPURITIES IN CRUDE BRINE.

Specification forming part of Letters Patent No. 210,541, dated December 3, 1878; application filed October 28, 1878.

*To all whom it may concern:*

Be it known that I, JOSEPH HEINRICH KÖNIG, of Mason City, in the county of Mason and State of West Virginia, have invented a new and useful Improvement in the Manufacture of Salt; and I do hereby declare that the following is a full, clear, and exact description of the same.

My invention relates to an improved process for the recovery of the salt, in the form of pure white crystals, from the brine of salt-springs, such as abound in West Virginia and other places. The brine as it comes from the wells contains in varying proportions chloride of barium, chloride of calcium, bromide of magnesium, and subcarbonate of iron, besides the chloride of sodium, which it is desired to recover.

Hitherto the chlorides of barium and calcium have been precipitated by alum, and the chloride of sodium crystallized out of solution and separated from the bromide of magnesium by virtue of its different solubility. The product obtained, however, was not of a pure merchantable quality by reason of its red color, due to the presence of the iron which was not eliminated. My process is designed to remedy this defect; and to this end it consists in precipitating the chloride of barium by sulphuric acid, and then precipitating the iron and calcium together as a carbonate by the addition of sal-soda, (carbonate soda,) and afterward crystallizing the pure chloride of sodium out of solution.

In carrying out my invention, for every one hundred gallons of the brine containing an average amount of chloride of barium, which would be about one ounce by weight, I add two pounds sulphuric acid, which precipitates the barium as sulphate of baryta, and forms, by decomposition, an equivalent of hydrochloric acid. The precipitate is then filtered out, and the liquor, containing chloride of sodium, hydrochloric acid, subcarbonate of iron, chloride of calcium, and bromide of magnesium, is admitted to the boilers, where, if the liquid be of average quality, (showing one ounce of iron and calcium,) two pounds sal-soda (carbonate soda) is added, and the liquor subjected to a boiling-heat. The following reaction then occurs: The sal-soda is decomposed, and the subcarbonate of lime and subcarbonate of iron are precipitated together while the equivalent of chlorine formerly held by the calcium and the equivalent of chlorine held by the hydrogen of the hydrochloric acid both unite with the base of the sal-soda to form new equivalents of chloride of sodium, which remain in solution with the partially-purified brine. The liquor, containing now only chloride of sodium and bromide of magnesium, is next decanted into an evaporating-vessel, and the chloride of sodium is crystallized out by evaporating the liquor to 35° Baumé, the bromide of magnesium being still held in the solution, while the pure salt separates as white crystals, which are subseqently ground for the market.

Instead of using sulphuric acid for precipitating the barium, I may employ sulphate of soda, which precipitates the barium as the sulphate of baryta, but, instead of giving an equivalent of hydrochloric acid, forms at once an equivalent of salt.

It will be seen from the foregoing that my process not only recovers the salt in a pure form, but also, by double decomposition, forms chloride of sodium, and gives a larger proportion of salt than exists in the crude liquor.

Having thus described my invention, what I claim as new is—

The process of recovering chloride of sodium from its admixture with impurities in crude brine, which consists in precipitating the chloride of barium by sulphuric acid, filtering out the precipitate, then precipitating the calcium and iron together as a subcarbonate by the addition of sal-soda, and afterward separating the clear liquor and crystallizing the pure salt out of solution from the bromide of magnesium, substantially as herein described.

JOSEPH HEINRICH KÖNIG.

Witnesses:
JAMES A. WADDELL,
EUPHEMEA WADDELL.